No. 693,635. Patented Feb. 18, 1902.
A. ZANNER.
APPARATUS FOR CONCENTRATING SULFURIC ACID.
(Application filed Oct. 26, 1901.)
(No Model.)

Witnesses:
George B. Gibel
F. E. Boyce

Inventor
Adolf Zanner
by Gopel Wahl
Attorneys.

UNITED STATES PATENT OFFICE.

ADOLF ZANNER, OF BRUSSELS, BELGIUM.

APPARATUS FOR CONCENTRATING SULFURIC ACID.

SPECIFICATION forming part of Letters Patent No. 693,635, dated February 18, 1902.

Application filed October 26, 1901. Serial No. 80,091. (No model.)

*To all whom it may concern:*

Be it known that I, ADOLF ZANNER, doctor of philosophy, a citizen of the Kingdom of Belgium, and a resident of Laeken-Brussels, Belgium, have invented a new and useful Apparatus for Concentrating Sulfuric Acid, of which the following is a specification.

Besides the expensive apparatus made of platinum or of an alloy of platinum and gold, heretofore apparatus made of cast-iron or of glass, porcelain, and the like have been used for the purpose of concentrating sulfuric acid. The apparatus made of cast-iron have several disadvantages, as they require the acid when charged therein to be already concentrated to a very high degree (about 64° Baumé) for preventing the tanks or vessels from being too quickly affected and corroded. Moreover, it is the principal inconvenience that the acid which is distilling off has a violently-corrosive action on the cast-iron surfaces above the level of the acid. On the other hand, the apparatus made of glass, porcelain, and the like resist more or less the action of the hot acid, but are not able to withstand high temperatures or variations of temperature, which easily cause breakage in such apparatus. Therefore such tanks or vessels made of glass or the like require provision for diminishing the direct action of the heat and for preventing variations of temperature—for instance, by placing the glass or porcelain vessels in a sand-bath or the like. Besides other inconveniences connected therewith, a considerable amount of heat is thereby lost, and the plants are necessarily enlarged without affording any certainty against breakage or explosion of the boilers or vessels.

It is with the object in view of eliminating the mentioned disadvantages that I have constructed an apparatus for concentrating sulfuric acid which combines the good qualities of the cast-iron in resisting high temperatures with that of porcelain, clay, and the like in being proof against the action of hot sulfuric acid.

My invention is illustrated in the accompanying drawings, in which—

Figure 1:
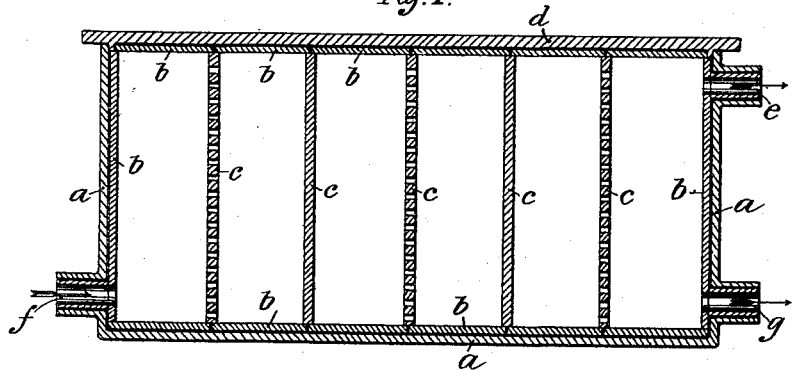
Figure 2:
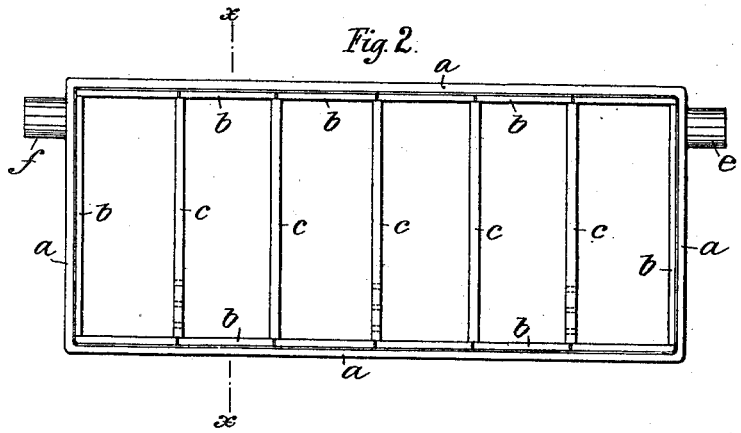
Figure 3:
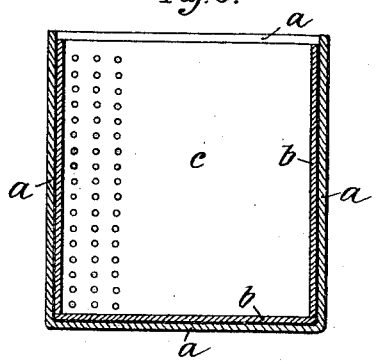

Figure 1 is a longitudinal section of a vessel or tank embodying the construction of my improved apparatus. Fig. 2 is a plan view of the said vessel, the cover being removed. Fig. 3 is a cross-section on the line $xx$, Fig. 2.

Similar letters of reference refer throughout to similar parts.

Referring to the drawings, $a$ is a vessel made of good cast-iron, the inner surfaces of which vessel are coated with porcelain, earthenware, or the like plates $b$ by cementing the said plates on the metal surfaces by means of a putty made of water-glass and asbestos. The joints between the said plates are likewise carefully filled with the said putty or cement. Although the cement is soon hardened, and thereby the plates are securely held on the metal surfaces, I prefer to arrange acid-proof cross-walls $c$ within the vessel for the purpose of securing the said plates in place on the metal walls, and I arrange the joints between the plates $b$, both on the bottom and side walls, so as to be covered by the edges of the said cross-walls for preventing the acid from affecting the cement within the said joints. By this construction, also, I am enabled to obtain a serpentine course of the acid passing through the vessel, as the said cross-walls $c$ are perforated at opposite ends, as clearly shown in Fig. 3, for allowing a free circulation of the acid. The cover $d$ is also made of cast-iron and on its inner side likewise coated with plates $b$, as above described, the joints between the plates being covered by the upper edges of the cross-walls $c$. A pipe $e$ serves for the outlet of the acid which is distilling off, and similar pipes $f$ and $g$, respectively, form the inlet and outlet passages of the acid, which is concentrated by passing through one or more of such acid-proof vessels. The pipes are similarly lined with protecting material, so as to withstand the action of the acid. If several vessels are used, arranged in succession and connected with each other, the last vessel may dispense with the bottom covering, as the acid being already concentrated to a high degree does not, essentially, affect the bottom in said last vessel.

Having now described my invention, I claim as new and desire to protect by Letters Patent—

1. In an improved apparatus for concentrating sulfuric acid, the combination of a cast-iron vessel, plates of earthenware completely covering the inner surfaces of the said vessel, a layer of water-glass and asbestos between the metal surfaces and plates and a plurality of perforated acid-proof cross-walls within said vessel securing said plates in place and covering the joints therebetween, substantially as described.

2. In an improved apparatus for concentrating sulfuric acid, the combination of a cast-iron vessel, a cast-iron cover on said vessel, inlet and outlet pipes entering said vessel, plates of earthenware completely coating the inner surfaces of the said vessel, cover and pipes, a layer of water-glass and asbestos between said plates and metal surfaces and a plurality of acid-proof cross-walls covering the joints between the plates and having perforations at alternate opposite ends to give the acid a serpentine course within the vessel, substantially as described.

In testimony that I claim the foregoing as my invention I have signed my name in presence of two subscribing witnesses.

ADOLF ZANNER.

Witnesses:
LOUIS WENGHOFFER,
HANS BRENNER.